US00RE38239E

(19) United States
(12) Reissued Patent
Duncan

(10) Patent Number: US RE38,239 E
(45) Date of Reissued Patent: Aug. 26, 2003

(54) AIR DRIVEN DIAPHRAGM PUMP

(75) Inventor: Greg S. Duncan, Huntington Beach, CA (US)

(73) Assignee: Wilden Pump & Engineering Co., Grand Terrace, CA (US)

(21) Appl. No.: 09/566,416

(22) Filed: May 5, 2000

Related U.S. Patent Documents

Reissue of:
(64) Patent No.: 5,378,122
Issued: Jan. 3, 1995
Appl. No.: 08/017,822
Filed: Feb. 16, 1993

(51) Int. Cl.[7] ..... F04B 43/06
(52) U.S. Cl. ..... 417/395; 417/413.1
(58) Field of Search ..... 417/393, 394, 417/395, 412, 413 R

(56) References Cited

U.S. PATENT DOCUMENTS

| | | | | |
|---|---|---|---|---|
| 1,920,014 A | | 7/1933 | Horton et al. | |
| 2,307,566 A | | 1/1943 | Browne | 102/152 |
| 2,383,193 A | | 8/1945 | Herbert | 103/152 |
| 2,576,747 A | | 11/1951 | Bryant | 222/250 |
| 2,653,552 A | | 9/1953 | Geeraert | 103/152 |
| 2,673,522 A | | 3/1954 | Dickey | 103/53 |
| 2,955,539 A | | 10/1960 | Gardner | 103/38 |
| 3,071,118 A | | 1/1963 | Wilden | 121/157 |
| 3,250,226 A | | 5/1966 | Voelker | 103/152 |
| 3,288,071 A | | 11/1966 | Anderson | |
| 3,304,126 A | | 2/1967 | Rupp et al. | 302/21 |
| 3,756,456 A | | 9/1973 | Georgi | 222/1 |
| 3,814,548 A | * | 6/1974 | Rupp | 417/395 |
| 3,816,034 A | | 6/1974 | Rosenquest, Jr. | 417/395 |
| 3,913,314 A | | 10/1975 | Yannone et al. | 60/39.14 |
| 4,241,602 A | | 12/1980 | Han et al. | 73/56 |
| 4,247,264 A | * | 1/1981 | Wilden | 417/393 |
| 4,288,230 A | | 9/1981 | Ebeling et al. | 23/230 |
| 4,315,523 A | | 2/1982 | Mahawili et al. | 137/486 |
| 4,367,140 A | * | 1/1983 | Wilson | 210/110 |
| 4,449,476 A | | 5/1984 | Voswinckel et al. | 118/674 |
| 4,472,115 A | | 9/1984 | Rupp | 417/393 |
| D275,858 S | * | 10/1984 | Wilden | D15/7 |
| 4,474,309 A | | 10/1984 | Solomon | 222/1 |
| 4,524,803 A | | 6/1985 | Stoll et al. | 137/625.64 |
| 4,547,680 A | | 10/1985 | Edler | 307/141 |
| 4,549,467 A | | 10/1985 | Wilden et al. | 91/307 |
| 4,597,721 A | | 7/1986 | Santefort | 417/393 |
| D294,946 S | * | 3/1988 | Wilden | D15/7 |
| D294,947 S | * | 3/1988 | Wilden | D15/7 |
| 4,778,356 A | | 10/1988 | Hicks | 417/397 |

(List continued on next page.)

FOREIGN PATENT DOCUMENTS

| | | | |
|---|---|---|---|
| AU | 217704 | 10/1980 | |
| GB | 1117516 | 6/1968 | 1/13.06 X |
| GB | 1234921 | 6/1971 | 4/43 X |

OTHER PUBLICATIONS

LMI—Liquid Metronics Division of the Milton Roy Co. Catalog of Metering Pumps (undated).
Brochure for Valco's Electronically Controlled Diaphragm Pumps (undated).

(List continued on next page.)

*Primary Examiner*—Charles G. Freay
(74) *Attorney, Agent, or Firm*—Fulbright & Jaworski L.L.P.

(57) ABSTRACT

A double diaphragm pump having an air chamber housing centrally located between two pump chamber housings. The air chamber housing includes a center section and two outwardly facing concave discs. Each pump chamber housing includes a pump chamber shell mating with one of the discs with a flexible diaphragm therebetween. Check valve chambers and inlet and outlet passages associated with each pump chamber and with inlet and exhaust manifolds control flow through the pump. A solenoid actuated valve alternately directs air pressure to each of the two diaphragms for reciprocal pumping action. Inner pistons associated with the diaphragms include stops which limit pump stroke in each direction. The solenoid may be driven by conventional electronics on a timed stroke or responsive to flow considerations.

7 Claims, 3 Drawing Sheets

U.S. PATENT DOCUMENTS

| | | | | |
|---|---|---|---|---|
| 4,796,782 | A | 1/1989 | Wales et al. | 222/57 |
| 4,828,464 | A | 5/1989 | Maier et al. | 417/388 |
| 4,897,797 | A | 1/1990 | Free, Jr. et al. | 364/500 |
| 5,056,036 | A | 10/1991 | Van Bork | 364/510 |
| 5,169,296 | A | 12/1992 | Wilden | 417/395 |
| 5,326,234 | A | 7/1994 | Versaw et al. | 417/393 |

OTHER PUBLICATIONS

Ingersoll–Rand Fluid Products catalog of ARO Pneumatic Valves and Logic Controls, dated 5/98.

Instruction manual for Iwaki Pneumatic–driven Bellow Pump FF–H Series, dated Dec. 1, 1993.

Article entitled "The Heart of the System" by Tony Hehn published in *Lift Equipment* Magazine, Apr.–May 1991.

Colgate–Palmolive Multicraft Training Project Course Outline, Jul. 21, 1989.

Article entitled "Diaphragm Pumps Save $30,000+ Per Year" by John Papamarcos, published in *Plant Services* Magazine, Apr. 1992.

Article entitled "Pneumatic Logic Defects Thread Breakage" by A.H. Hehn and A. Varacins published in *Hydraulics & Pneumatics* Magazine, May 1975.

Article entitled "Pneumatic Logic Control Conveyor Line" by A.H. Hehn and A. Varacins.

Operating Instructions for an Electronic Metering Pump.

Article from publication entitled *Pump Application Engineering,* by Tyler G. Hicks, P.E. and T.W. Edwards, P.E. copyright 1971.

Publication entitled *Machine Design,* 1981, pp. 40–53.

Publication entitled *The How of Pneumatic Logic Control* published by Clippard Instrument Laboratory, Inc. (undated).

Catalog for Graymills Corp., pp. 22, 23, & 48–51, 1990.

Catalog for Lincoln Co. pp. 16, 17, 29, 37, & 32 (undated).

Fluid Power Design Handbook, Second Edition, by Frank Yeaple, *Design News Magazine*.

Excerpts from catalog by Yamada America Inc. of Double Diaphragm Pump F Series (undated).

Article entitled "Nonmetallic Pumps for Corrosive Erosive Service" by edward Margus, from *Plant Engineering,* Oct. 22, 1992.

Design drawings of the Iwaki Pneumatic Bellows Pump dated Nov. 4, 1988.

Excerpts from book entitled *Industrial Hydraulics* by John Pippenger and Tyler G. Hicks, copyright 1962.

Brochure by Graco Co. entitled *Hydra–Cat Plural Component Proportioning Systems for Tire–Fill Operations,* Mar. 3, 1976 and accompanying materials.

File History for U.S. Ser. No. 68,182–German et al.—Abandoned 1968.

* cited by examiner

AIR DRIVEN DIAPHRAGM PUMP

Matter enclosed in heavy brackets [ ] appears in the original patent but forms no part of this reissue specification; matter printed in italics indicates the additions made by reissue.

BACKGROUND OF THE INVENTION

The field of the present invention is control mechanisms for air driven diaphragm pumps.

Pumps having double diaphragms driven by compressed air directed through an actuator valve are well known. Reference is made to U.S. Pat. Nos. 5,169,296; 4,247,264; U.S. Pat. Des. Nos. 294,946; 294,947; and 275,858, all issued to James K. Wilden, the disclosures of which are incorporated herein by reference. An actuator valve operated on a feedback control system is disclosed in U.S. Pat. No. 3,071,118 issued to James K. Wilden, the disclosure of which is also incorporated herein by reference. This feedback control system has been employed with the double diaphragm pumps illustrated in the other patents.

Such pumps include an air chamber housing having a center section and two concave discs facing outwardly from the center section. Opposing the two concave discs are pump chamber housings. The pump chamber housings are coupled with an inlet manifold and an outlet manifold through ball check valves positioned in the inlet passageways and outlet passageways from and to the inlet and outlet manifolds, respectively. Diaphragms extend outwardly to mating surfaces between the concave discs and the pump chamber housings. The diaphragms with the concave discs and with the pump chamber housings each define an air chamber and a pump chamber to either side thereof. At the centers thereof, the diaphragms are fixed to a control rod which slidably extends through the air chamber housing.

Traditionally, actuator valves associated with such pumps have included feedback control mechanisms including a valve piston and airways on the control rod attached to the diaphragms. Air pressure is alternately generated in each air chamber according to control rod location, driving the diaphragms back and forth. In turn, the pump chambers alternately expand and contract to pump material therethrough. Such pumps are capable of pumping a wide variety of materials of widely varying consistency.

Turning to the area of reciprocating power, various reciprocating devices have been known to use a constant supply of air pressure and a solenoid valve to provide an alternating flow of air for driving the reciprocating motions. Such devices may require any number of mechanisms for timing of the strokes including feedback control as well as simple set interval actuation.

SUMMARY OF THE INVENTION

The present invention is directed to an air driven double diaphragm pump employing an actuator valve which provides alternating pressure to the diaphragms independently of the stroke position of the pump. In association with reciprocal control, pistons act to limit the stroke of the double diaphragms to accomplish desired pumping characteristics.

Accordingly, it is an object of the present invention to provide an improved air driven diaphragm pump. Other and further objects and advantages will appear hereinafter.

DETAILED DESCRIPTION OF THE PREFERRED EMBODIMENT

Figure 2:
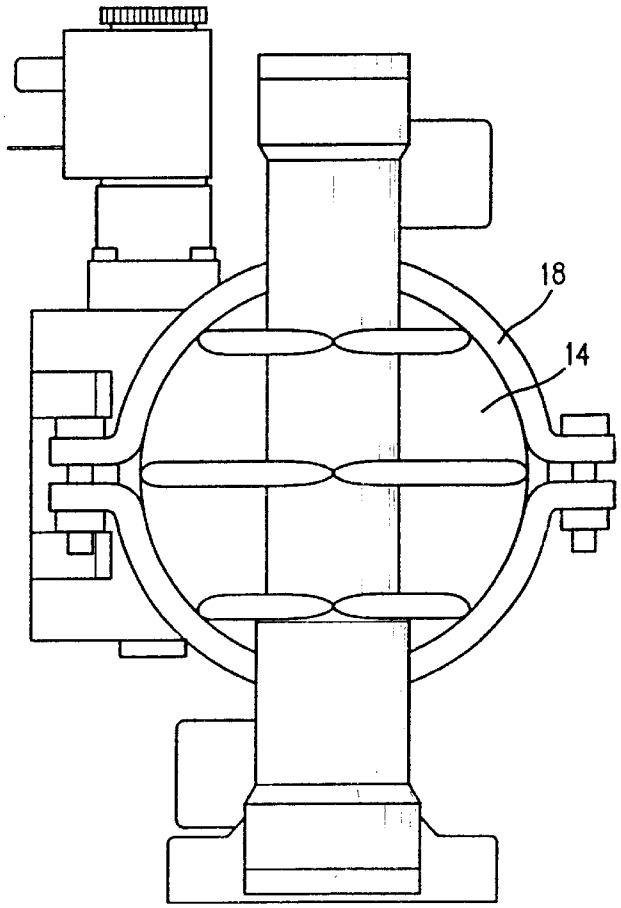
FIG. 2 is a side view of a pump of the present invention.
Figure 1:
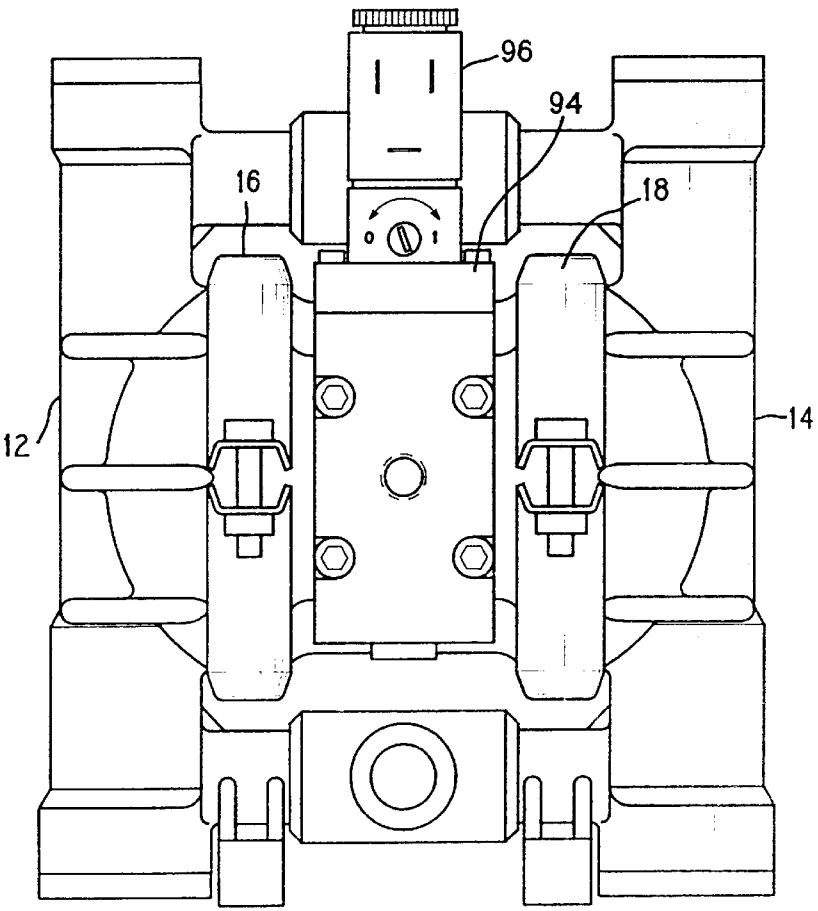
FIG. 1 is a front view of a pump of the present invention.
Figure 3:
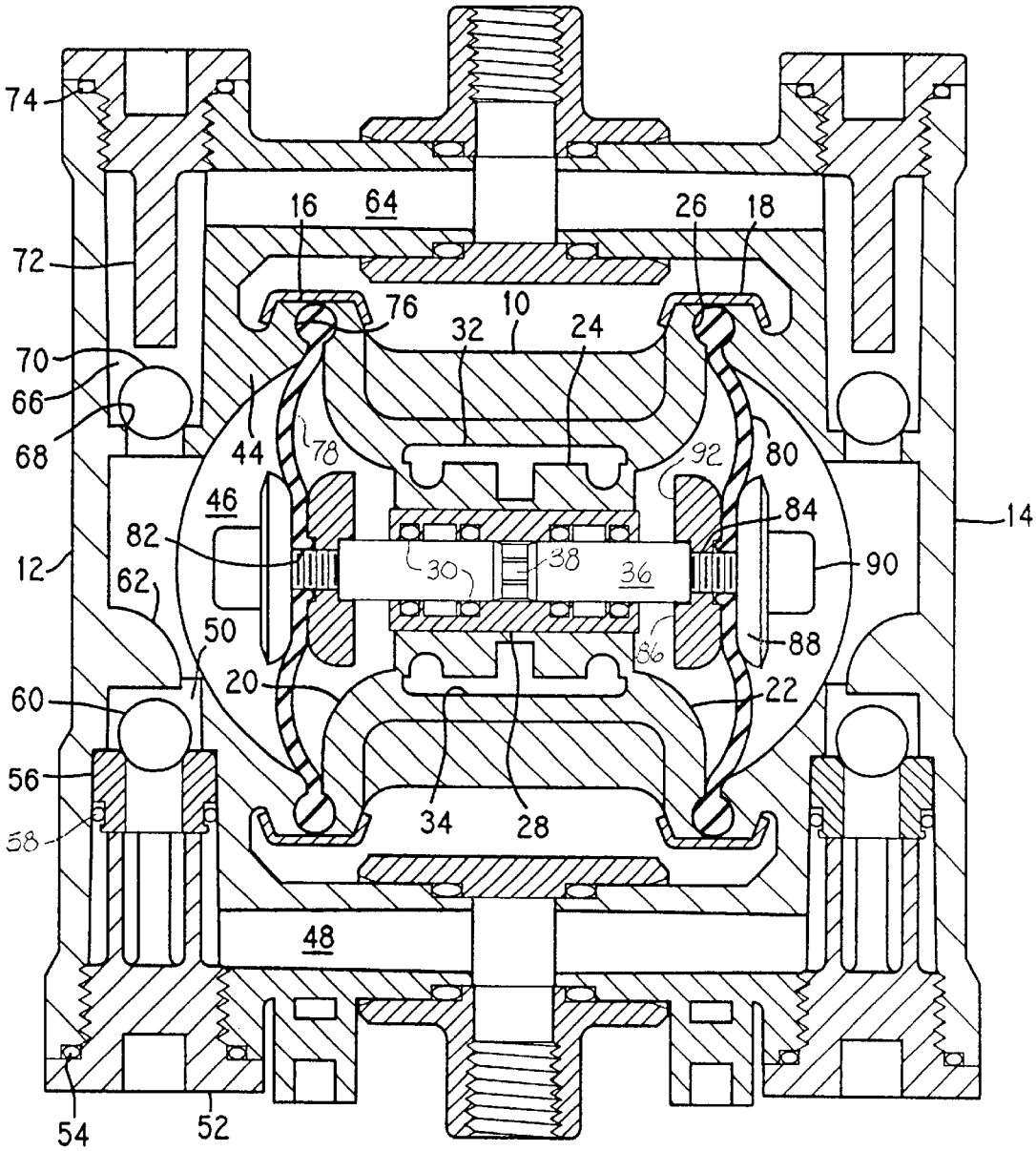
FIG. 3 is a cross-sectional elevation taken along the centerline of the pump.

Turning in detail to the drawings, an air driven double diaphragm pump is illustrated. The pump itself is found to be in three principal structural pieces, an air chamber housing 10 and two pump chamber housings 12 and 14. Clamp bands 16 and 18 hold these components together.

The air chamber housing 10 is shown to include two outwardly facing concave discs 20 and 22 which are integrally formed with a center section 24. The discs 20 and 22 extend outwardly to a circular periphery having a form compatible with one of the clamp bands 16 and 18. A circular recess 26 accommodates the periphery of a diaphragm. The center section 24 includes a bushing 28. The bushing 28 includes artifacts of an air driven reciprocating control valve. A plain bushing with a single O-ring 30 would suffice. Additional O-rings and passages are illustrated which are unnecessary in this embodiment. Exhaust passages 32 and 34 vent air from the air chambers.

Figure 4:
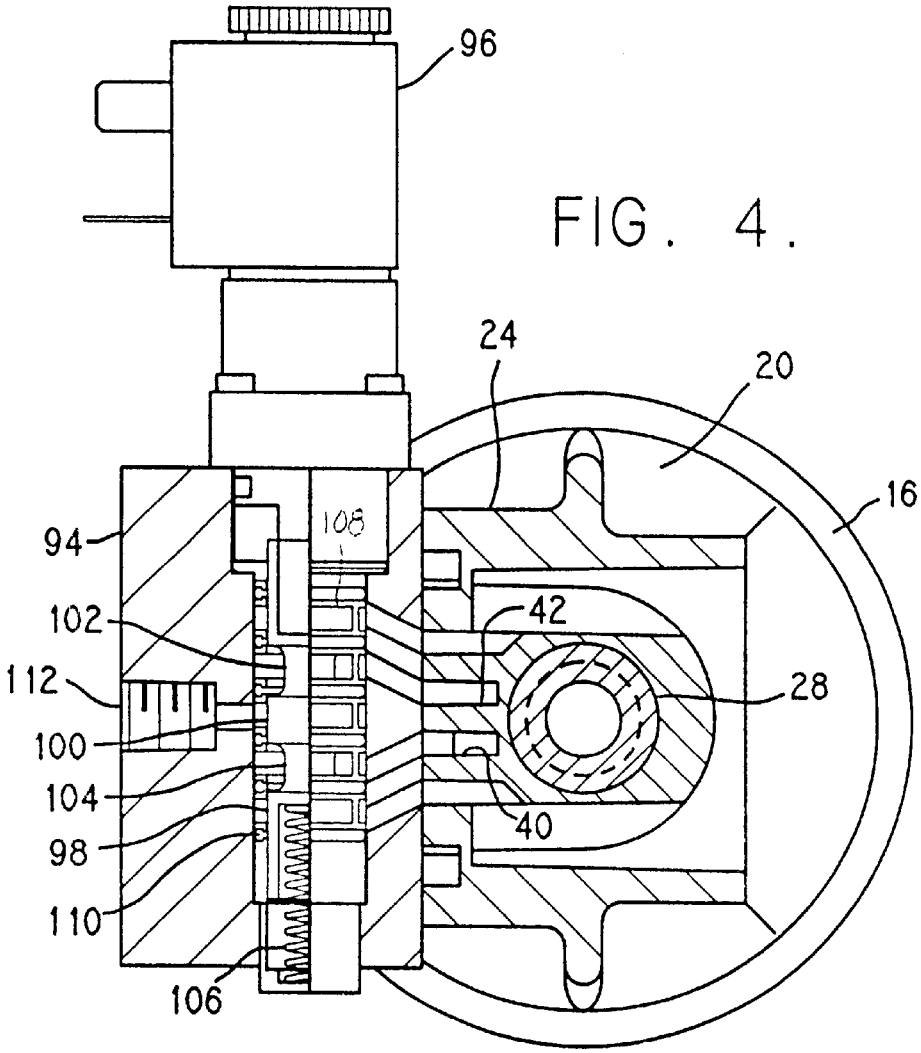
FIG. 4 is a cross-sectional view taken centrally through the pump center section and actuator valve.
Figure 5:
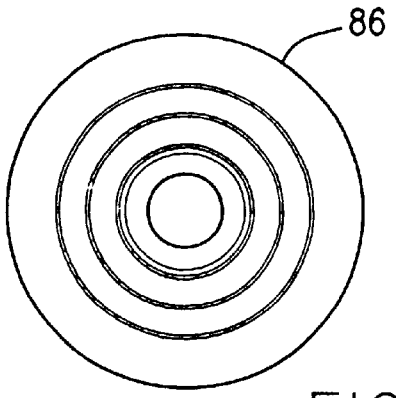
FIG. 5 is a plan view of an inner piston of the pump.

Located in the bushing 28 is a control rod 36. The control rod 36 is slidably arranged and need not include the central passage 38 for purposes of this embodiment. Referring specifically to FIG. 4, the center section 24 is shown to include supply passages 40 and 42. The supply passage 40 extends through the concave disc 20 while the supply passage 42 extends through the concave disc 22 in the opposite direction.

The two pump chamber housings 12 and 14 may be identical. Each housing 12 and 14 includes a pump chamber shell 44 defining a pump chamber 46. Extending from the pump chamber shell 44 is an inlet passage 48 and an inlet check valve chamber 50. The inlet passages, in association with a T-coupling, form an inlet manifold.

Contained within the inlet passage 48 and the inlet check valve chamber 50 is a spacer 52 threadably attached to one of the housings 12 and 14 with the junction sealed by an O-ring 54. The spacer 52 positions a valve seat 56 with an O-ring 58 preventing bypass of the controlled passage. A ball valve 60 cooperates with the valve seat 56 to form a one-way valve. A stop 62 retains the ball valve 60 in position.

Also extending from the pump chamber shell 44 is an outlet passage 64 and an outlet check valve chamber 66. The outlet passages, in association with another T-coupling, form an outlet manifold. The outlet check valve chamber 66 includes a seat 68. A ball valve 70 cooperates with the seat 68 to provide a one-way check valve. A stop 72 extends into the outlet check valve chamber 66 to retain position of the ball valve 70. The stop 72 is threadably fixed within the outlet passage 64 and includes an O-ring 74 to insure proper sealing.

The two pump chamber housings 12 and 14 also include a circular recess 76 to receive the periphery of the diaphragms. The outer portion of the pump chamber shell 44 is circular and adapted to cooperate with one of the clamp bands 16 and 18.

Two diaphragms 78 and 80 are retained within the circular recesses 26 and 76 about their periphery. The diaphragms may be of conventional construction for air driven diaphragm pumps, defining with the concave discs 20 and 22 and the pump chamber shells 44 and air chamber and a pump chamber on either side of each diaphragm 78 and 80. Each diaphragm 78 and 80 includes a center opening 82 for anchoring to the control rod 36. The control rod 36 includes a threaded portion 84 at each end thereof. At each end, an inner piston 86 and an outer piston 88 cooperate to retain each of the diaphragms 78 and 80. A nut 90 is threaded onto the control rod 36 at each end to retain the pistons 86 and 88.

The inner pistons 86 each include a stop surface 92 which is positioned to abut against the center section 24 to define the limits of the stroke of the control rod 36. The inner pistons 86 may be available in varying thicknesses to accommodate different pump characteristics.

Associated with the air driven diaphragm pump is an actuator valve 94. In the present embodiment, the actuator valve 94 operates independently of the stroke position of the control rod 36. A solenoid 96 controls the valve 94. Conventional electronic control may be employed to reciprocate the valve 94 through the solenoid 96 on a timed basis, on a pump flow basis, on a flow pressure basis or on external controls and circumstances.

The actuator valve 94 is shown to include a piston 98 having a central land 100 and two circumferential passages 102 and 104. A spring 106 biases the piston 98 in a first direction to cooperate with the solenoid 96. Spacers 108 with O-rings 110 therebetween prevent communication axially along the valve. An inlet 112 receives a constant pressurized source of air. Supply passages 40 and 42 are alternately communicated with the inlet 112 depending on the position of the piston 98. Alternatively, the supply passage of the supply passages 40 and 42 which is not in communication with the inlet 112 is in communication with its respective exhaust passage of the exhaust passages 32 and 34. Thus, as one air chamber is being filled, the other air chamber is allowed to exhaust. Through reciprocation of the solenoid, the pump is alternately driven in one direction or the other until it stalls against a stop surface 92 of one of the inner pistons 86.

The thickness of the inner pistons 86 may be selected to provide varying pump performance characteristics. For example, thick inner pistons 86 would act to minimize pressure surges. The thinner inner pistons 86 would maximize flow. Where each side is intended for a different pumping function, the inner pistons 86 may be of different thicknesses to accomplish different results. Finally, empirical selection of the thickness for each inner piston 86 would define a specific quantity of flow per stroke such that the pump itself may be used to accurately measure volumes.

Thus, an air driven diaphragm pump controlled by a solenoid, valve with controlled stroke length has been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An air driven double diaphragm pump comprising an air chamber housing having a center section and two outwardly facing concave discs rigidly positioned to either side of said center section;

two pump chamber housings fixed to said air chamber housing and mating with said two outwardly facing concave discs about the periphery thereof, respectively;

a control rod slidably extending through said center section of said air chamber housing and extending concentrically through said two outwardly facing concave discs;

two diaphragms concentrically fixed to the ends of said control rod, respectively, and extending outwardly to the mating peripheries of said two outwardly facing concave discs and said two pump chamber housings, respectively;

two pistons on said control rod between said two diaphragms and said air chamber housing, respectively, each piston including a stop facing said air chamber housing to abut against said air chamber housing to define the extent of slidable movement of said control rod;

an actuator valve [coupled with] *immediately attached to* said air chamber housing *and including an air inlet and an actuator piston* to provide alternating pressure to said diaphragms independently of the position of said control rod.

2. The pump of claim 1 wherein said actuator valve is a solenoid valve.

3. The pump of claim 2 wherein said solenoid valve includes timed alternation of pressure to said diaphragms.

*4. An air driven double diaphragm pump comprising*

*an air chamber housing having a center section and two outwardly facing concave discs rigidly positioned to either side of said center section;*

*two pump chamber housings fixed to said air chamber housing and mating with said two outwardly facing concave discs about the periphery thereof, respectively;*

*a control rod slidably extending through said center section of said air chamber housing and extending concentrically through said two outwardly facing concave discs;*

*two diaphragms concentrically fixed to the ends of said control rod, respectively, and extending outwardly to the mating peripheries of said two outwardly facing concave discs and said two pump chamber housings, respectively;*

*two pistons on said control rod between said two diaphragms and said air chamber housing, respectively, each piston including a stop facing said air chamber housing to abut against said air chamber housing to define the extent of slidable movement of said control rod;*

*an actuator valve attached to said air chamber housing and including an air inlet and an actuator piston to provide alternating pressure to said diaphragms independently of the position of said control rod, said actuator piston having two positions, a first position with said air inlet in communication with one of said two outwardly facing concave discs and a second position with said air inlet in communication with the other of said two outwardly facing concave discs.*

*5. The pump of claim 4, said actuator valve being a solenoid valve.*

*6. The pump of claim 4, said solenoid valve includes timed alternation of pressure to said diaphragms.*

*7. An air driven double diaphragm pump comprising*

*an air chamber housing having a center section and two outwardly facing concave discs rigidly positioned to either side of said center section;*

*two pump chamber housings fixed to said air chamber housing and mating with said two outwardly facing concave discs about the periphery thereof, respectively;*

*a control rod slidably extending through said center section of said air chamber housing and extending concentrically through said two outwardly facing concave discs;*

*two diaphragms concentrically fixed to the ends of said control rod, respectively, and extending outwardly to the mating peripheries of said two outwardly facing concave discs and said two pump chamber housings, respectively;*

*two pistons on said control rod between said two diaphragms and said air chamber housing, respectively, each piston including a stop facing said air chamber housing to abut against said air chamber housing to define the extent of slidable movement of said control rod;*

*an actuator valve attached to said air chamber housing and including an air inlet, an actuator piston and a spring, said actuator piston providing alternating pressure to said diaphragms independently of the position of said control rod and having two positions, a first position with said air inlet in communication with one of said two outwardly facing concave discs and a second position with said air inlet in communication with the other of said two outwardly facing concave discs, said actuator valve being a solenoid valve, said spring biasing said actuator piston toward said first position, said actuator piston being in said second position with actuation of said solenoid valve.*

* * * * *